UNITED STATES PATENT OFFICE.

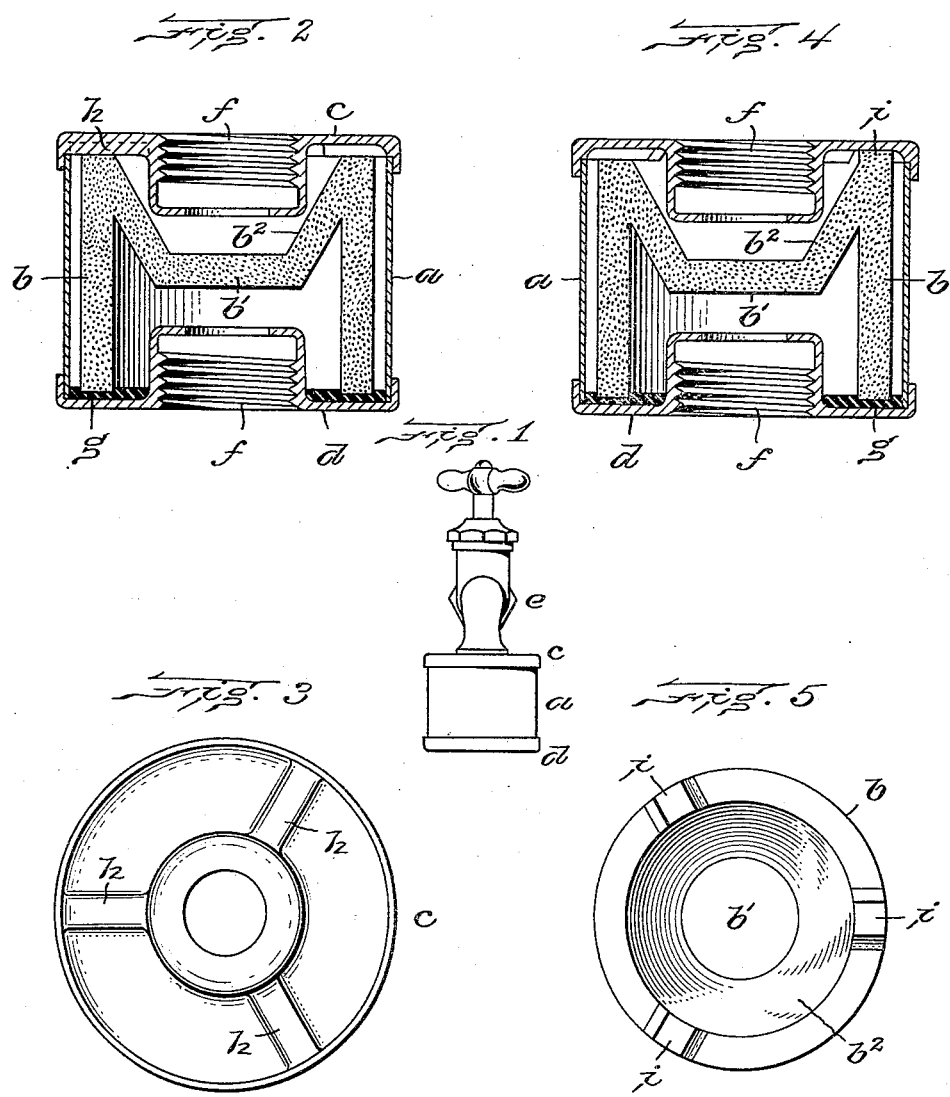

FREDERICK W. PENDERGAST, OF CAMBRIDGE, AND BENJAMIN HINSLEY, OF BOSTON, MASSACHUSETTS.

FILTER.

No. 931,472.   Specification of Letters Patent.   Patented Aug. 17, 1909.

Application filed September 5, 1908. Serial No. 451,848.

*To all whom it may concern:*

Be it known that we, FREDERICK W. PENDERGAST and BENJAMIN HINSLEY, respectively of Cambridge, in the county of Middlesex, and of Boston, in the county of Suffolk and State of Massachusetts, have invented certain new and useful Improvements in Filters, of which the following is a specification.

This invention relates to filters and has for its object to provide a small, compact and efficient filter which can be screwed to the end of any water-tap or faucet, and can be reversed without disconnecting any of the piping leading to the faucet in order to permit cleaning.

A second object is to combine in a filter of small outside dimensions the greatest possible extent of surface of the filtering material exposed to the water entering the same.

A still further object is to construct the filter with provisions for attachment to the faucet without the formation of external attaching means, and therefore without increasing its total length beyond the ends of its body portion.

The details of the filter are set forth in the following specification and illustrated in the accompanying drawings, in which,—

Figure 1 represents a front elevation of a faucet with the filter attached. Fig. 2 represents a central vertical section of the filter. Fig. 3 represents an inverted plan view of one of the heads. Fig. 4 represents a vertical section of a modified form. Fig. 5 represents a top plan view of the form of filtering member shown in Fig. 4.

The same reference characters indicate the same parts in all the figures.

As illustrated in the drawings, the filter consists of a casing $a$ with an internal filtering element $b$. The casing is preferably made cylindrical, its sides consisting of a tube, and its ends being flat heads or caps $c$ and $d$. Each of these caps has an orifice, and is constructed so that either orifice may be screwed to the threaded end of a faucet or tap $e$. To permit of such attachment, the heads are provided with inwardly extending lips or bosses $f$ which are internally threaded. The extent of these bosses is sufficient to provide room for a great enough number of turns of the thread to enable a rigid and water-tight joint to be made with the faucet, while at the same time the fact that they extend inwardly gives provision for such attachment to the faucet without increasing the total length of the filter casing. The formation of the internal thread also enables the filter to be applied to faucets such as are ordinarily used in house plumbing.

The filtering member $b$ is preferably made of emery held together by a firm bonding material so that it is hard and permanent in form, and is molded as a hollow cylinder with a transverse web. The external diameter of the member is somewhat less than the internal diameter of the casing $a$, so that an annular space for the flow of water is left between the filtering member and the casing wall. The length of the member is such that it fits tightly between the heads $c$ and $d$ and presses firmly against a packing disk $g$ inserted between its end and the head $d$. This packing member is preferably of leather or other equally suitable compressible substance which makes a tight enough joint between the unyielding member $b$ and the head $d$ to prevent the passage of unfiltered water between them. The pressure of the filter member against the packing is produced by the upper head $c$ which is forced down upon the member $b$ after it is in place. Contact between the member and head $c$ is not continuous, but is produced only at a number of separated points by means of ribs or projections $h$ on the inner surface of the head, or, conversely, by projections $i$ on the filter member itself. Between these ribs or projections are spaces which allow free flow of the liquid around the upper edge of the filter member into the space between the latter and the sides of the casing.

Between the cylindrical walls of the filter member $b$ is the transverse web $b'$ which is offset well into the interior of the member and is connected with its upper edge by conical walls $b^2$. By offsetting the web in this manner, an interior filtering surface is provided in addition to the external cylindrical surface, so that the greatest possible surface effective for filtering is provided in a small volume.

When the heads are applied to the body of the casing, they are preferably soldered so that they cannot afterward be removed.

The orifice in the head $c$ is normally the inlet, while that in the head $d$ is the outlet. It will be seen from the drawing that the filter member is interposed between the inlet and outlet so that no liquid can pass from the latter without first percolating through the filter member, while the shape of the latter gives great enough surface exposed to the incoming liquid to allow the same to pass rapidly through it, and to flow from the outlet with considerable force and in a compact stream.

When the filter has been in use for some time a deposit of sediment collects on the surface which is exposed to the incoming liquid, and this deposit may be removed by simply disconnecting the filter and reversing it, screwing the outlet orifice upon the faucet. When the liquid is then allowed to flow through, it does so in a reversed direction, and removes the sediment from the surfaces of the filtering member, allowing the sediment to pass out through the inlet orifice.

We claim:—

1. A filter comprising a tubular shell and flat heads secured to opposite ends of said shell, forming a casing, said heads having internally threaded orifices adapted to be screwed upon the end of a faucet, one of which serves as the inlet and the other as the outlet, and a filtering member having a substantially cylindrical portion gripped between the heads, and having a transverse web extending across between the inlet and outlet, the said member making contact with the head in which is the inlet orifice at separated points, between which points of contact are spaces to permit flow of the liquid around its external surface, and the filter as a whole being reversible to permit cleaning.

2. A filter comprising a tubular shell and flat heads secured to opposite ends of said shell, forming a casing, said heads having internally threaded orifices adapted to be screwed upon the end of a faucet, one of which serves as the inlet and the other as the outlet, a filtering member having a substantially cylindrical portion gripped between the heads, and having a transverse web extending across between the inlet and outlet, the said member making contact with the head in which is the inlet orifice at separated points, between which points of contact are spaces to permit the flow of the liquid around its external surface, and the web being offset well into the interior of the member to afford an extended inner filtering surface, and a yielding packing interposed between the end of the filtering member and the outlet to prevent escape of unfiltered liquid.

3. In combination with a filter casing having inlet and outlet orifices, a cup-shaped porous filter member consisting of a cylindrical portion and a transverse web offset into the interior of said member, arranged between the said orifices and making a liquid-tight contact with the casing around one of the orifices, being held clamped between the opposite end walls of the casing, so that liquid in flowing from one orifice to the other must pass either from outside of the cup through its walls into its interior, or from the inside outward, and the filter as a whole being reversible to permit such flow in either direction.

In testimony whereof we have affixed our signatures, in presence of two witnesses.

<div style="text-align:center">
his<br>
FREDERICK + W. PENDERGAST.<br>
mark.<br>
BENJAMIN HINSLEY.
</div>

Witnesses:
  ARTHUR H. BROWN,
  PETER W. PEZZETI.